Feb. 6, 1940. J. W. LEIGHTON 2,188,909
SUSPENSION ARM
Original Filed Oct. 19, 1936
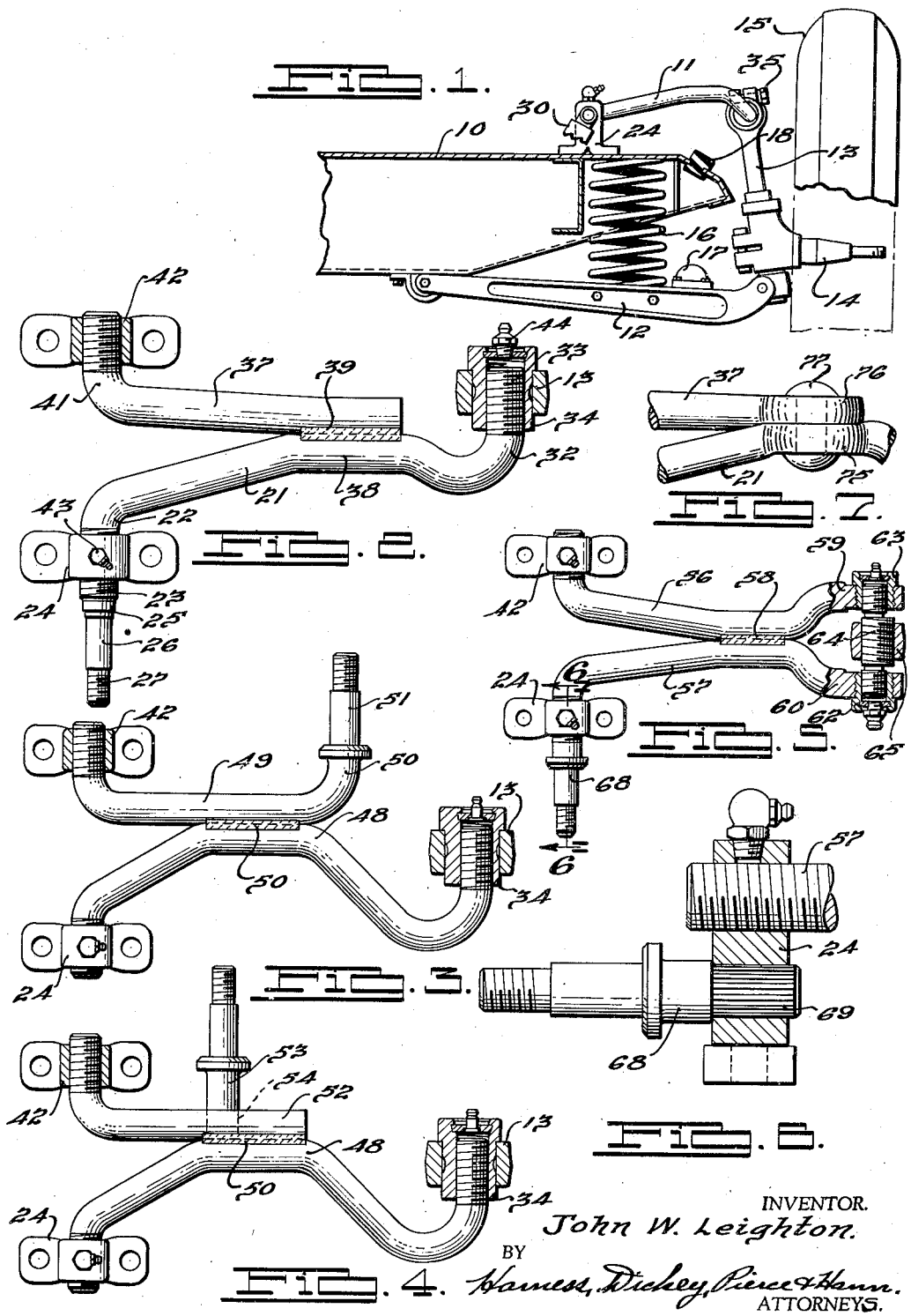
INVENTOR.
John W. Leighton.
BY
Barnes, Dickey, Pierce & Hann.
ATTORNEYS.

Patented Feb. 6, 1940

2,188,909

UNITED STATES PATENT OFFICE 2,188,909

SUSPENSION ARM

John W. Leighton, Port Huron, Mich.

Application October 19, 1936, Serial No. 106,340
Renewed May 1, 1939

9 Claims. (Cl. 267—20)

The invention relates generally to motor vehicles and it has particular relation to the construction of upper arms in individual wheel suspensions.

One object of the invention is to provide an upper arm construction for individual wheel suspensions, which is strong, durable, and efficient in operation, and which is more economical to manufacture.

Another object of the invention is to provide an improved upper arm construction having also incorporated therein, improved means for connecting the arm to a shock absorber.

Another object of the invention is to provide an improved bracket for pivotally connecting the upper arm of the suspension to the motor vehicle frame.

Another object of the invention is to provide an improved bracket which also has means for connecting the upper end of a shock absorber to the bracket.

Other objects of the invention will become apparent from the following specification, the drawing relating thereto, and from the claims hereinafter set forth.

For a better understanding of the invention, reference may be had to the drawing, wherein:

Figure 1 is a fragmentary, elevational view, illustrating an individual wheel suspension of a type wherein upper arms constructed according to the present invention are incorporated.

Fig. 2 is a plan view of the upper arm shown in Figure 1 and illustrates one form of the invention.

Fig. 3 is a view similar to Fig. 1 illustrating another form of the invention.

Fig. 4 is a view similar to Fig. 3, and illustrates still another form of the invention.

Fig. 5 is a view generally similar to the other, illustrating another form of the invention.

Fig. 6 is a cross-sectional view on a slightly larger scale taken substantially along the line 6—6 of Fig. 5.

Fig. 7 is a detail view, illustrating a rivet connection that may be used between parts of the arms.

Referring to Figure 1, the frame of an automobile is indicated at 10, and upper and lower arms 11 and 12 of an individual suspension are pivotally connected to the frame at their inner ends. The outer ends of these arms are pivotally connected to a wheel supporting member 13 and an axle 14 is rotatable on the member 13 and supports a wheel 15. A spring 16 is disposed between the under side of the frame and the lower arm 12 and a cushioning element 17 may be provided on the lower arm for engaging the frame to limit downward movement of the frame relative to the lower arm. A second cushioning element 18, secured to the frame, is adapted to engage the under side of the upper arm 11, so as to limit upward movement of the frame relative to the arms. The description so far is intended generally to set forth the structure of the individual wheel suspension shown, so that the upper arm which forms the subject matter of the present invention, may be better understood at least in so far as its operation is concerned.

Referring now to Figure 2, it will be seen that the upper arm comprises a long member 21 which at its left or inner end has an end portion bent outwardly from the body of the arm, as indicated at 22. This end portion is threaded as indicated at 23 for pivotal, threaded engagement with a bracket 24 secured to the frame, and beyond the threaded portion 23, the end portion has reduced cylindrical portions, such as indicated at 25 and 26, for anchoring the upper end of a shock absorber. Beyond the cylindrical portion 26, the end of the arm is still further reduced in diameter and is threaded as indicated at 27. It will be understood that outwardly of the threaded portion 23, the end of the arm is designed to be fastened to the shock absorber in a pivotal manner. It may be mentioned that the shock absorber is indicated at 30 in Figure 1 and that it ordinarily will comprise two telescopic parts, one connected to the arm as described and the other connected to an intermediate portion of the lower arm.

At its opposite end, the arm 21 is turned in the direction opposite the end portion 22, as indicated at 32, and this end portion is threaded, as indicated at 33, and pivotally and threadably receives an eccentric bushing 34 held in an opening in the upper end of the wheel mounting member 13. In the wheel mounting member shown, the eye portion receiving the bushing 34 is split and is adapted to be clamped about the bushing by means of a bolt 35 shown in Figure 1. The bushing is of eccentric character so that by loosening the bolt 35 and turning the bushing, the upper end of the arm 13 may be adjusted inwardly and outwardly so as to provide a camber adjustment. A second arm 37, which is shorter than the arm 21, is welded to the latter along an intermediate straight portion 38 thereof, and it will be noted that the weld extends throughout a substantial linear distance, as indicated at 39. These arms are of round bar stock and in welding their adjacent straight portions, the actual contact of the arms will be enlarged considerably during the welding operation due to the fact that the contact will change from a line contact to a substantial area contact. In other words, the final welded connection will not only be of substantial length but also will be of substantial width. Either arc welding or butt welding will be suitable for joining the arms.

At its inner end, the arm 37 has an outwardly turned portion 41 which is threaded into a second bracket 42 that is identical to the bracket 24. On the frame, these brackets are axially aligned, that is, the axes of the openings therein coincide and consequently when the arms 21 and 37 are assembled with the brackets, a single axis of pivotal movement is provided. The threaded bearings in the brackets may be lubricated by grease fittings, such as indicated at 43, and a grease fitting may be provided for the bushing 34, as indicated at 44.

The upper arm construction, which has been described and which is illustrated in Figure 2, is very simple in design and yet it is manifest that it is extremely strong and durable and that the parts it connects will positively be retained in the desired relationship. Since the arms are constructed of round bar stock, it will be appreciated that the threaded portions, etc. thereon may be quickly and inexpensively provided before the ends of the arm are bent. All that is required in manufacturing the upper arm is providing the threads and reduced portions on the ends of the two parts, which may be readily effected by rapid production machinery, then bending the arms, and then welding them. The simplicity of the construction and the few steps required in its manufacture results in a much lower cost.

In Figure 3, a similar arrangement is provided comprising an arm portion 48 and an arm portion 49 that are welded as indicated at 50. While the end portions of the arm 48 in this case more sharply diverge from the arm 49, the arrangement is much the same as in Figure 2. The principal difference between the two structures is that the outer end of the arm 49 is bent, as indicated at 50, and has a shock absorber connecting portion 51. This portion extends substantially parallel to the other threaded ends of the arms.

The construction shown by Figure 4 is similar to Figure 3 excepting that instead of using the arm 49, an arm 52 is employed which is similar to the arm 37 in Figure 2 in shape. In this construction, a separate shock absorber pin 53 is mounted in opening 54 in the arm 52. It will be understood that the pin is rigidly fastened in the opening 54 such as by providing serrations on the pin and driving the serrated end into the opening.

In the construction shown by Figure 5, arms 56 and 57 are provided which are identical in shape except that they are oppositely disposed. These arms are welded along a linear portion indicated at 58. At the outer ends the arms are provided with spaced portions 59 and 60 having openings for receiving bushings 61 and 62 that in turn threadably and pivotally receive a pin 64. This pin at its center has a larger and oppositely threaded portion 65 which receives the eye of the wheel mounting member 13, it being understood that in this case the eye portion would be threaded. The larger portion 64 of the pin is of eccentric character and is adjustably locked in the eye by means of a clamping bolt such as shown at 35 in Figure 1.

The arms 56 and 57 have oppositely turned ends threaded into the brackets in the same manner as previously described. For anchoring the shock absorber in this construction, the bracket 24, as shown by Figure 6, has a pin 68 rigidly fastened therein, as indicated at 69. Thus, the bracket 24 serves not only as a pivotal threaded bearing for the arm 57 but also serves as a support for the shock absorber anchoring pin 68.

In all of the foregoing constructions, the upper arm is fashioned from round bar stock and no machining is required other than for the formation of the threaded ends and cylindrical portions shown in certain of the figures. The two parts of the arm can readily be fashioned and bent into the desired forms and after such bending of the arms, they may be welded together. These operations are inexpensive and it is apparent that very few steps are required to manufacture the finished arm. After its manufacture, it is a very simple procedure to thread the brackets on the threaded inner ends and to connect the upper end of the wheel mounting member to the outer end of the arm. The parts are positively held in predetermined relation and this insures efficiency not only of the threaded bearings but of the suspension in general. It will be apparent that the arm has great strength in both the vertical and horizontal directions and that the shape of the arm necessarily will result in a strong assembly.

While the foregoing structures embody a welded connection, it might be desirable to employ a rivet connection such as shown in Figure 7. In this case, the rod elements, indicated at 21 and 37, although they may be the rod elements in any of the figures, are upset and flattened to provide enlarged portions 75 and 76 and these are secured together by a rivet 77. Under certain circumstances this type of connection may be desirable even though an upsetting operation is required.

Although more than one form of the invention has been illustrated and described in detail, it will be apparent to those skilled in the art that various modifications may be made without departing from the scope of the appended claims.

What is claimed is:

1. An arm for an individual suspension comprising a pair of bars arranged in side by side relation and being welded together along a substantial linear portion, said bars diverging relatively at one side of the weld and terminating in offset, substantially aligned bearing portions, one of the bars extending beyond the end of the other at the opposite side of the weld and terminating in offset bearing portion substantially parallel to the first bearing portions, and a pin projecting from one of the bars adjacent the welded connection for attaching a shock absorber to the arm.

2. An arm for an individual suspension comprising a pair of bars arranged in side by side relation and being welded together along a substantial linear portion, said bars diverging relatively at one side of the weld and terminating in offset, substantially aligned bearing portions, one of the bars extending beyond the end of the other at the opposite side of the weld and terminating in offset bearing portion substantially parallel to the first bearing portions, and a pin projecting from one of the bars adjacent the welded connection for attaching a shock absorber to the arm, said pin comprising an integral offset portion of the shorter bar.

3. An arm for an individual wheel suspension comprising a pair of bars, means interconnecting the bars intermediate the ends of the arm, a pin element projecting laterally from one bar intermediate the ends of the arm for connecting a shock absorber thereto, and means on opposite ends of the arm for pivotally connecting the latter to a vehicle frame and to a wheel mounting member respectively.

4. An arm for an individual wheel suspension comprising a pair of bars, means interconnecting the bars intermediate the ends of the arm, one of the bars having one end terminating inwardly of the adjacent end of the other bar and being offset to provide shock absorber attachment means disposed intermediate the ends of the arm, and means on opposite ends of the arm for pivotally connecting such ends to a vehicle frame and wheel mounting member, respectively.

5. An arm for pivotally connecting a wheel support to a vehicle frame in an individual wheel suspension, comprising a first bar having its ends formed to provide substantially parallel but transversely spaced bearing portions, a second bar having its ends formed to provide substantially parallel but transversely spaced bearing portions that are spaced a lesser amount than the bearing portions on the first bar, and means connecting the bars at a point intermediate the ends of the first bar with the axis of the bearing portion at one end of the first bar substantially in alignment with the axis of the bearing portion at one end of the second bar, the other bearing portions being substantially parallel to said axis and one of them being adapted for connecting a shock absorber thereto.

6. An arm for pivotally connecting a wheel support to a vehicle frame in an individual wheel suspension, comprising a first bar having its ends bent or offset to provide substantially parallel and transversely spaced bearing projections, a second bar having its ends bent or offset to provide spaced, substantially parallel bearing projections that are spaced a lesser amount than the projections on the first bar, and means connecting the bars at a point intermediate the ends of the first bar with the axis of the projection at one end of the first bar substantially aligned with the axis of the projection at one end of the second bar, the other projections being substantially parallel to but spaced different amounts from said axis and one of them being adapted for connecting a shock absorber thereto.

7. An arm for an individual suspension, comprising a first bar substantially of U shape and having a base portion and substantially parallel, bearing ends, a second bar bent at its ends to provide parallel bearing portions and having a base portion extending transversely between such ends and which is disposed alongside the base portion of the first bar, and means securing such base portions together.

8. An arm for an individual suspension, comprising a first bar substantially of U shape and having a base portion and substantially parallel, bearing ends, a second bar bent at its ends to provide parallel bearing portions and having a base portion extending transversely between such ends and which is disposed alongside the base portion of the first bar, and means securing such base portions together, the bearing portions on one bar being spaced less than the bearing portions on the other and one of the bearing portions on one bar being in axial alignment with one of the bearing portions on the other bar.

9. An arm for pivotally connecting a wheel support to a vehicle frame in an individual wheel suspension, comprising a pair of bars rigidly connected intermediate their ends, each bar at one end of the arm having an offset with the offsets substantially in alignment and forming a bearing support for pivotally connecting the bars to the frame, the other ends of the bars having offset ends which are spaced longitudinally of the arm, and the outermost of which is adapted to be connected to the wheel support and the inner one to be connected to a shock absorber.

JOHN W. LEIGHTON.